United States Patent
Karr et al.

(10) Patent No.: US 11,561,730 B1
(45) Date of Patent: *Jan. 24, 2023

(54) SELECTING PATHS BETWEEN A HOST AND A STORAGE SYSTEM

(71) Applicant: PURE STORAGE, INC., Mountain View, CA (US)

(72) Inventors: Ronald Karr, Palo Alto, CA (US); John Mansperger, San Jose, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,943

(22) Filed: Nov. 30, 2020

Related U.S. Application Data

(63) Continuation of application No. 16/411,075, filed on May 13, 2019, now Pat. No. 10,884,666, which is a
(Continued)

(51) Int. Cl.
*G06F 3/06* (2006.01)
*G06F 13/16* (2006.01)
(Continued)

(52) U.S. Cl.
CPC ............ *G06F 3/0659* (2013.01); *G06F 3/061* (2013.01); *G06F 3/067* (2013.01); *G06F 3/0619* (2013.01);
(Continued)

(58) Field of Classification Search
CPC ...... G06F 3/0659; G06F 3/061; G06F 3/0619; G06F 3/0635; G06F 3/0665; G06F 3/067;
(Continued)

(56) References Cited

U.S. PATENT DOCUMENTS

| 4,887,235 A | 12/1989 | Holloway et al. |
| 5,455,934 A | 10/1995 | Holland et al. |

(Continued)

FOREIGN PATENT DOCUMENTS

| EP | 0725324 A2 | 8/1996 |
| WO | 2012087648 A2 | 6/2012 |

(Continued)

OTHER PUBLICATIONS

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.
(Continued)

*Primary Examiner* — Tuan V Thai

(57) ABSTRACT

Managing input/output ('I/O') queues in a data storage system, including: receiving, by a host that is coupled to a plurality of storage devices via a storage network, a plurality of I/O operations to be serviced by a target storage device; determining, for each of a plurality of paths between the host and the target storage device, a data transfer maximum associated with the path; determining, for one or more of the plurality of paths, a cumulative amount of data to be transferred by I/O operations pending on the path; and selecting a target path for transmitting one or more of the plurality of I/O operations to the target storage device in dependence upon the cumulative amount of data to be transferred by I/O operations pending on the path and the data transfer maximum associated with the path.

17 Claims, 7 Drawing Sheets

Related U.S. Application Data continuation of application No. 15/965,964, filed on Apr. 29, 2018, now Pat. No. 10,289,344, which is a continuation of application No. 15/668,881, filed on Aug. 4, 2017, now Pat. No. 10,001,951, which is a continuation of application No. 15/042,718, filed on Feb. 12, 2016, now Pat. No. 9,760,297.

(51) Int. Cl.
*G06F 11/34* (2006.01)
*G06F 11/30* (2006.01)

(52) U.S. Cl.
CPC .......... *G06F 3/0635* (2013.01); *G06F 3/0665* (2013.01); *G06F 3/0689* (2013.01); *G06F 13/161* (2013.01); *G06F 13/1642* (2013.01); *G06F 11/3034* (2013.01); *G06F 11/3433* (2013.01)

(58) Field of Classification Search
CPC ...... G06F 3/0689; G06F 13/00; G06F 13/161; G06F 13/1642; G06F 12/00
See application file for complete search history.

(56) References Cited

U.S. PATENT DOCUMENTS

| | | | |
|---|---|---|---|
| 5,706,210 A | | 1/1998 | Kumano et al. |
| 5,742,792 A | * | 4/1998 | Yanai ................ G06F 3/064 |
| | | | 714/763 |
| 5,799,200 A | | 8/1998 | Brant et al. |
| 5,933,598 A | | 8/1999 | Scales et al. |
| 6,012,032 A | | 1/2000 | Donovan et al. |
| 6,052,797 A | * | 4/2000 | Ofek .................. G06F 11/2064 |
| | | | 709/219 |
| 6,085,333 A | | 7/2000 | DeKoning et al. |
| 6,477,610 B1 | * | 11/2002 | Willenborg ............ G06F 13/30 |
| | | | 710/308 |
| 6,643,641 B1 | | 11/2003 | Snyder |
| 6,647,514 B1 | | 11/2003 | Umberger et al. |
| 6,789,162 B1 | | 9/2004 | Talagala et al. |
| 6,834,324 B1 | | 12/2004 | Wood |
| 6,889,275 B2 | | 5/2005 | Vandecappelle et al. |
| 7,089,272 B1 | | 8/2006 | Garthwaite et al. |
| 7,107,389 B2 | | 9/2006 | Inagaki et al. |
| 7,146,521 B1 | | 12/2006 | Nguyen |
| 7,152,131 B2 | | 12/2006 | Saen et al. |
| 7,162,658 B2 | | 1/2007 | Golasky et al. |
| 7,334,124 B2 | | 2/2008 | Pham et al. |
| 7,437,530 B1 | | 10/2008 | Rajan |
| 7,493,424 B1 | | 2/2009 | Bali et al. |
| 7,669,029 B1 | | 2/2010 | Mishra et al. |
| 7,689,609 B2 | | 3/2010 | Lango et al. |
| 7,743,191 B1 | | 6/2010 | Liao |
| 7,899,780 B1 | | 3/2011 | Shmuylovich et al. |
| 8,041,869 B2 | | 10/2011 | Thomas et al. |
| 8,042,163 B1 | | 10/2011 | Karr et al. |
| 8,086,585 B1 | | 12/2011 | Brashers et al. |
| 8,200,887 B2 | | 6/2012 | Bennett |
| 8,213,312 B2 | * | 7/2012 | Saito ........................ H04L 45/00 |
| | | | 709/239 |
| 8,271,700 B1 | | 9/2012 | Annem et al. |
| 8,387,136 B2 | | 2/2013 | Lee et al. |
| 8,437,189 B1 | | 5/2013 | Montierth et al. |
| 8,465,332 B2 | | 6/2013 | Hogan et al. |
| 8,527,544 B1 | | 9/2013 | Colgrove et al. |
| 8,566,546 B1 | | 10/2013 | Marshak et al. |
| 8,578,442 B1 | | 11/2013 | Banerjee |
| 8,613,066 B1 | | 12/2013 | Brezinski et al. |
| 8,620,970 B2 | | 12/2013 | English et al. |
| 8,751,463 B1 | | 6/2014 | Chamness |
| 8,762,642 B2 | | 6/2014 | Bates et al. |
| 8,769,622 B2 | | 7/2014 | Chang et al. |
| 8,800,009 B1 | | 8/2014 | Beda et al. |
| 8,812,860 B1 | | 8/2014 | Bray |
| 8,850,546 B1 | | 9/2014 | Field et al. |
| 8,898,346 B1 | | 11/2014 | Simmons |
| 8,909,854 B2 | | 12/2014 | Yamagishi et al. |
| 8,931,041 B1 | | 1/2015 | Banerjee |
| 8,949,863 B1 | | 2/2015 | Coatney et al. |
| 8,984,602 B1 | | 3/2015 | Bailey et al. |
| 8,990,905 B1 | | 3/2015 | Bailey et al. |
| 9,026,694 B1 | | 5/2015 | Davidson et al. |
| 9,081,713 B1 | | 7/2015 | Bennett |
| 9,124,569 B2 | | 9/2015 | Hussain et al. |
| 9,134,922 B2 | | 9/2015 | Rajagopal et al. |
| 9,189,334 B2 | | 11/2015 | Bennett |
| 9,209,973 B2 | | 12/2015 | Aikas et al. |
| 9,250,823 B1 | | 2/2016 | Kamat et al. |
| 9,300,660 B1 | | 3/2016 | Borowiec et al. |
| 9,311,182 B2 | | 4/2016 | Bennett |
| 9,444,822 B1 | | 9/2016 | Borowiec et al. |
| 9,507,532 B1 | | 11/2016 | Colgrove et al. |
| 9,632,870 B2 | | 4/2017 | Bennett |
| 9,760,297 B2 | | 9/2017 | Karr et al. |
| 10,001,951 B1 | | 6/2018 | Karr et al. |
| 10,289,344 B1 | | 5/2019 | Karr et al. |
| 2002/0013802 A1 | | 1/2002 | Mori et al. |
| 2003/0145172 A1 | | 7/2003 | Galbraith et al. |
| 2003/0191783 A1 | | 10/2003 | Wolczko et al. |
| 2003/0225961 A1 | | 12/2003 | Chow et al. |
| 2004/0080985 A1 | | 4/2004 | Chang et al. |
| 2004/0111573 A1 | | 6/2004 | Garthwaite |
| 2004/0153844 A1 | | 8/2004 | Ghose et al. |
| 2004/0193814 A1 | | 9/2004 | Erickson et al. |
| 2004/0260967 A1 | | 12/2004 | Guha et al. |
| 2005/0066097 A1 | | 3/2005 | Kawamoto et al. |
| 2005/0160416 A1 | | 7/2005 | Jamison et al. |
| 2005/0188246 A1 | | 8/2005 | Emberty et al. |
| 2005/0216800 A1 | | 9/2005 | Bicknell et al. |
| 2006/0015771 A1 | | 1/2006 | Van Gundy et al. |
| 2006/0031593 A1 | | 2/2006 | Sinclair |
| 2006/0129817 A1 | | 6/2006 | Borneman et al. |
| 2006/0161726 A1 | | 7/2006 | Lasser |
| 2006/0230245 A1 | | 10/2006 | Gounares et al. |
| 2006/0239075 A1 | | 10/2006 | Williams et al. |
| 2007/0022227 A1 | | 1/2007 | Miki |
| 2007/0028068 A1 | | 2/2007 | Golding et al. |
| 2007/0055702 A1 | | 3/2007 | Fridella et al. |
| 2007/0109856 A1 | | 5/2007 | Pellicone et al. |
| 2007/0150689 A1 | | 6/2007 | Pandit et al. |
| 2007/0168321 A1 | | 7/2007 | Saito et al. |
| 2007/0220227 A1 | | 9/2007 | Long |
| 2007/0294563 A1 | | 12/2007 | Bose |
| 2007/0294564 A1 | | 12/2007 | Reddin et al. |
| 2008/0005587 A1 | | 1/2008 | Ahlquist |
| 2008/0077825 A1 | | 3/2008 | Bello et al. |
| 2008/0162674 A1 | | 7/2008 | Dahiya |
| 2008/0195833 A1 | | 8/2008 | Park |
| 2008/0205519 A1 | | 8/2008 | Goodart et al. |
| 2008/0270678 A1 | | 10/2008 | Cornwell et al. |
| 2008/0282045 A1 | | 11/2008 | Biswas et al. |
| 2009/0077340 A1 | | 3/2009 | Johnson et al. |
| 2009/0100115 A1 | | 4/2009 | Park et al. |
| 2009/0198889 A1 | | 8/2009 | Ito et al. |
| 2010/0049905 A1 | | 2/2010 | Ouchi |
| 2010/0052625 A1 | | 3/2010 | Cagno et al. |
| 2010/0211723 A1 | | 8/2010 | Mukaida |
| 2010/0246266 A1 | | 9/2010 | Park et al. |
| 2010/0257142 A1 | | 10/2010 | Murphy et al. |
| 2010/0262764 A1 | | 10/2010 | Liu et al. |
| 2010/0325345 A1 | | 12/2010 | Ohno et al. |
| 2010/0332754 A1 | | 12/2010 | Lai et al. |
| 2011/0072290 A1 | | 3/2011 | Davis et al. |
| 2011/0125955 A1 | | 5/2011 | Chen |
| 2011/0131231 A1 | | 6/2011 | Haas et al. |
| 2011/0167221 A1 | | 7/2011 | Pangal et al. |
| 2012/0023144 A1 | | 1/2012 | Rub |
| 2012/0054264 A1 | | 3/2012 | Haugh et al. |
| 2012/0079318 A1 | | 3/2012 | Colgrove et al. |
| 2012/0131253 A1 | | 5/2012 | McKnight et al. |
| 2012/0137075 A1 | | 5/2012 | Vorbach |
| 2012/0303919 A1 | | 11/2012 | Hu et al. |

(56) References Cited

U.S. PATENT DOCUMENTS

| | | |
|---|---|---|
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0178011 A1 | 6/2015 | Sadhukhan et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |

FOREIGN PATENT DOCUMENTS

| | | |
|---|---|---|
| WO | 2013071087 A1 | 5/2013 |
| WO | 2014110137 A1 | 7/2014 |
| WO | 2016015008 A1 | 1/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |
| WO | 2017138991 A1 | 8/2017 |

OTHER PUBLICATIONS

Etsi, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Apr. 29, 2016, 12 pages.

International Search Report and Written Opinion, PCT/US2016/015008, dated May 4, 2016, 12 pages.

International Search Report and Written Opinion, PCT/US2016/016333, dated Jun. 8, 2016, 12 pages.

International Search Report and Written Opinion, PCT/US2016/020410, dated Jul. 8, 2016, 12 pages.

International Search Report and Written Opinion, PCT/US2016/032052, dated Aug. 30, 2016, 17 pages.

International Search Report and Written Opinion, PCT/US2016/032084, dated Jul. 18, 2016, 12 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

International Search Report and Written Opinion, PCT/US2016/059817, dated Jan. 23, 2017, 10 pages.

Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity", Microsoft (online), Apr. 2014, 36 pages, URL: www.aka.ms/HybridIdentityWp.

Pcmag, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.

Sweere, "Creating Storage Class Persistent Memory with NVDIMM", Published in Aug. 2013, Flash Memory Summit 2013, URL: http://

(56) References Cited

OTHER PUBLICATIONS ww.flashmemorysummit.com/English/Collaterals/Proceedings/2013/20130814_T2_Sweere.pdf, 22 pages.
Techopedia, "What is a disk array", techopedia.com (online), Jan. 13, 2012, 1 page, URL: web.archive.org/web/20120113053358/http://www.techopedia.com/definition/1009/disk-array.
Webopedia, "What is a disk array", webopedia.com (online), May 26, 2011, 2 pages, URL: web/archive/web/20110526081214/http://www.webopedia.com/TERM/D/disk_array.html.
Wikipedia, "Convergent Encryption", Wikipedia.org (online), accessed Sep. 8, 2015, 2 pages, URL: en.wikipedia.org/wiki/Convergent_encryption.

\* cited by examiner

SELECTING PATHS BETWEEN A HOST AND A STORAGE SYSTEM

CROSS-REFERENCE TO RELATED APPLICATIONS

This application is a continuation application of and claims priority from U.S. patent application Ser. No. 16/411,075, filed May 13, 2019, which is a continuation application of and claims priority from U.S. Pat. No. 10,289,344, issued May 14, 2019, which is a continuation application of and claims priority from U.S. Pat. No. 10,001,951, issued Jun. 19, 2018, which is a continuation application of and claims priority from U.S. Pat. No. 9,760,297, issued Sep. 12, 2017.

BACKGROUND

Technical Field

The field of the invention is data processing, or, more specifically, methods, apparatus, and products for managing input/output ('I/O') queues in a data storage system.

Background Art

Enterprise storage systems can include many storage devices that are available for use by users of many types. Users of enterprise storage systems may initiate I/O operations such as, for example, reading data from a storage device in the storage system, writing data to a storage device in the storage system, and so on. Such I/O operations must typically pass through various software and hardware modules.

SUMMARY OF INVENTION

Methods, apparatuses, and products for managing I/O queues in a data storage system, including: receiving, by a host that is coupled to a plurality of storage devices via a storage network, a plurality of I/O operations to be serviced by a target storage device; determining, for each of a plurality of paths between the host and the target storage device, a data transfer maximum associated with the path, wherein the data transfer maximum specifies a cumulative amount of data that may be associated with I/O operations pending on the path; determining, for one or more of the plurality of paths, a cumulative amount of data to be transferred by I/O operations pending on the path; and selecting a target path for transmitting one or more of the plurality of I/O operations to the target storage device in dependence upon the cumulative amount of data to be transferred by I/O operations pending on the path and the data transfer maximum associated with the path.

The foregoing and other objects, features and advantages of the invention will be apparent from the following more particular descriptions of example embodiments of the invention as illustrated in the accompanying drawings wherein like reference numbers generally represent like parts of example embodiments of the invention.

DESCRIPTION OF EMBODIMENTS

Figure 1:
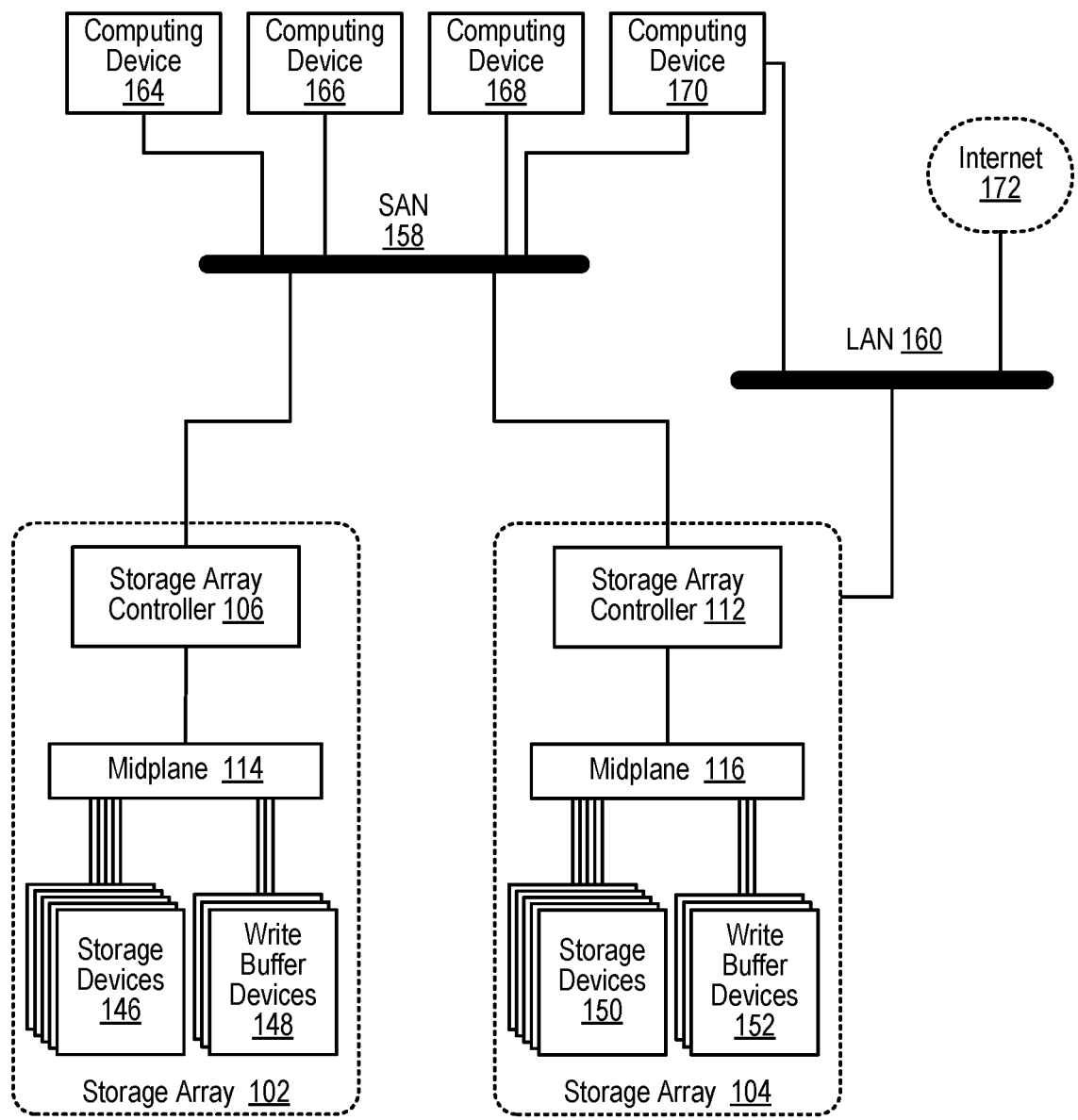
FIG. 1 sets forth a block diagram of a storage system configured for managing I/O queues according to embodiments of the present disclosure.

Example methods, apparatus, and products for managing I/O queues in a data storage system in accordance with the present invention are described with reference to the accompanying drawings, beginning with FIG. 1. FIG. 1 sets forth a block diagram of a storage system configured for managing I/O queues according to embodiments of the present disclosure. The storage system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152) that are utilized as write caches.

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150). In addition, the storage array controller (106, 112) can accumulate more writes and organize writing to the storage devices (146, 150) for greater efficiency with better compression and with more time (and more and larger blocks of accumulated write data) for de-duplication. Such write buffer devices (148, 152) effectively convert storage arrays of solid-state drives (e.g., "Flash drives") from latency limited devices to throughput limited devices. In such a way, the storage array controller (106, 112) may be given more time to better organize what is written to the storage devices (146, 150), but after doing so, are not then mechanically limited like disk-based arrays are.

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like.

The storage array controllers (106, 112) of FIG. 1 may be useful in managing I/O queues in a storage system according to embodiments of the present disclosure. The storage array controllers (106, 112) may assist in managing I/O queues in a data storage system by: receiving an I/O operation to be serviced by a target storage device; determining, for each of a plurality of paths, a data transfer maximum associated with the path; determining, for one or more of the plurality of paths, a cumulative amount of data to be transferred by I/O operations pending on the path; and selecting a target path for transmitting the I/O operation to the target storage device in dependence upon the cumulative amount of data to be transferred by I/O operations pending on the path and the data transfer maximum associated with the path, and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Managing I/O queues in a data storage system in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in managing I/O queues in a data storage system according to embodiments of the present disclosure.

Figure 2:
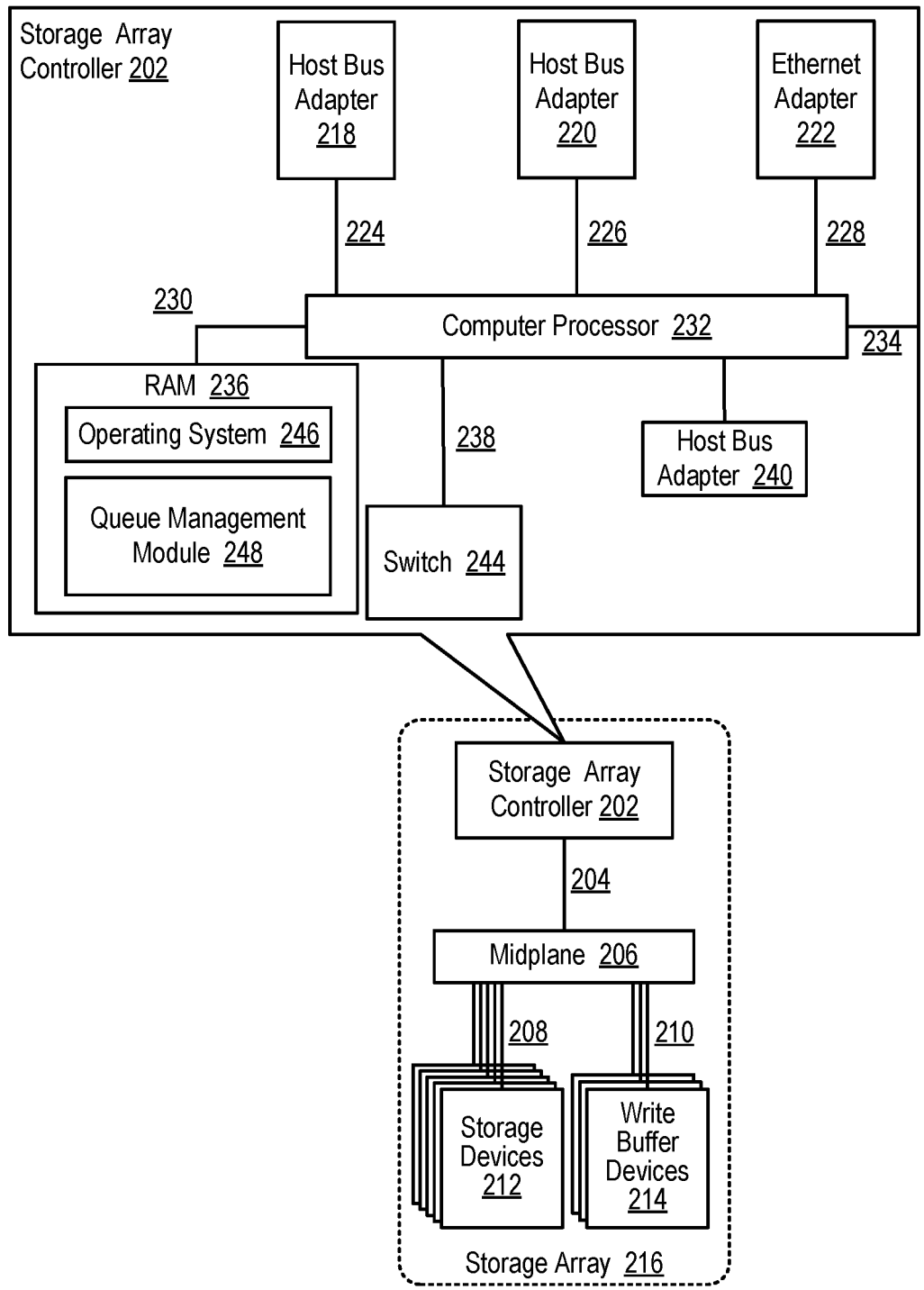
FIG. 2 sets forth a block diagram of a storage array controller useful in managing I/O queues in a data storage system according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more write buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (236) is an operating system (246). Examples of operating systems useful in storage array controllers (202) configured for managing I/O queues in a data storage system according to embodiments of the present disclosure include UNIX™, Linux™, Microsoft Windows™, and others as will occur to those of skill in the art. Also stored in RAM (236) is a queue management module (248), a module that includes computer program instructions useful in managing I/O queues in a data storage system according to embodiments of the present disclosure.

The queue management module (248) may compress data in dependence upon characteristics of a storage system by: receiving an I/O operation to be serviced by a target storage device; determining, for each of a plurality of paths between the host and the target storage device, a data transfer maximum associated with the path, wherein the data transfer maximum specifies a cumulative amount of data that may be associated with I/O operations pending on the path; determining, for one or more of the plurality of paths, a cumulative amount of data to be transferred by I/O operations pending on the path; and selecting a target path for transmitting the I/O operation to the target storage device in dependence upon the cumulative amount of data to be transferred by I/O operations pending on the path and the data transfer maximum associated with the path, as will be described in greater detail below.

The queue management module (248) may further managing I/O queues in a data storage system by: selecting a target path in further dependence upon the amount of data to be transferred when executing the one or more I/O operations; determining, for each of the plurality of paths, whether a sum of the amount of data to be transferred when executing the I/O operation and the cumulative amount of data to be transferred by I/O operations pending on the path is greater than the data transfer maximum associated with the path; responsive to determining, for each of the plurality of paths, that the sum of the amount of data to be transferred when executing the I/O operation and the cumulative amount of data to be transferred by I/O operations pending on the path is greater than the data transfer maximum associated with the path, delaying a selection of the target path responsive to determining, for each of the plurality of paths, that the sum of the amount of data to be transferred when executing the I/O operation and the cumulative amount of data to be transferred by I/O operations pending on the path is greater than the data transfer maximum associated with the path; determining whether an amount of data associated with the I/O operation is less than a predetermined size; responsive to determining that the amount of data associated with the I/O operation is less than the predetermined size, selecting the target path for transmitting the I/O operation to the storage device in further dependence upon a number of I/O operations pending on the path; tuning the data transfer maximum associated with one or more paths, including: modifying, for one or more of the plurality of paths, the data transfer maximum associated with the path; determining, in dependence upon one or more performance metrics, whether path performance has improved after the data transfer maximum associated with the path was modified; and responsive to determining that path performance has not improved after the data transfer maximum associated with the path was modified, reverting the data transfer maximum associated with the path to its previous state; and responsive to determining that path performance has improved after the data transfer maximum associated with the path was modified, modifying the data transfer maximum associated with the path, as will be described in greater detail below.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, as a Target Channel Adapter, as a SCSI/Storage Target Adapter, and so on. Each of the host bus adapters (218, 220, 222) may be coupled to the computer processor (232) via a data communications link (224, 226, 228) such as, for example, a PCIe bus.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 may also include a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
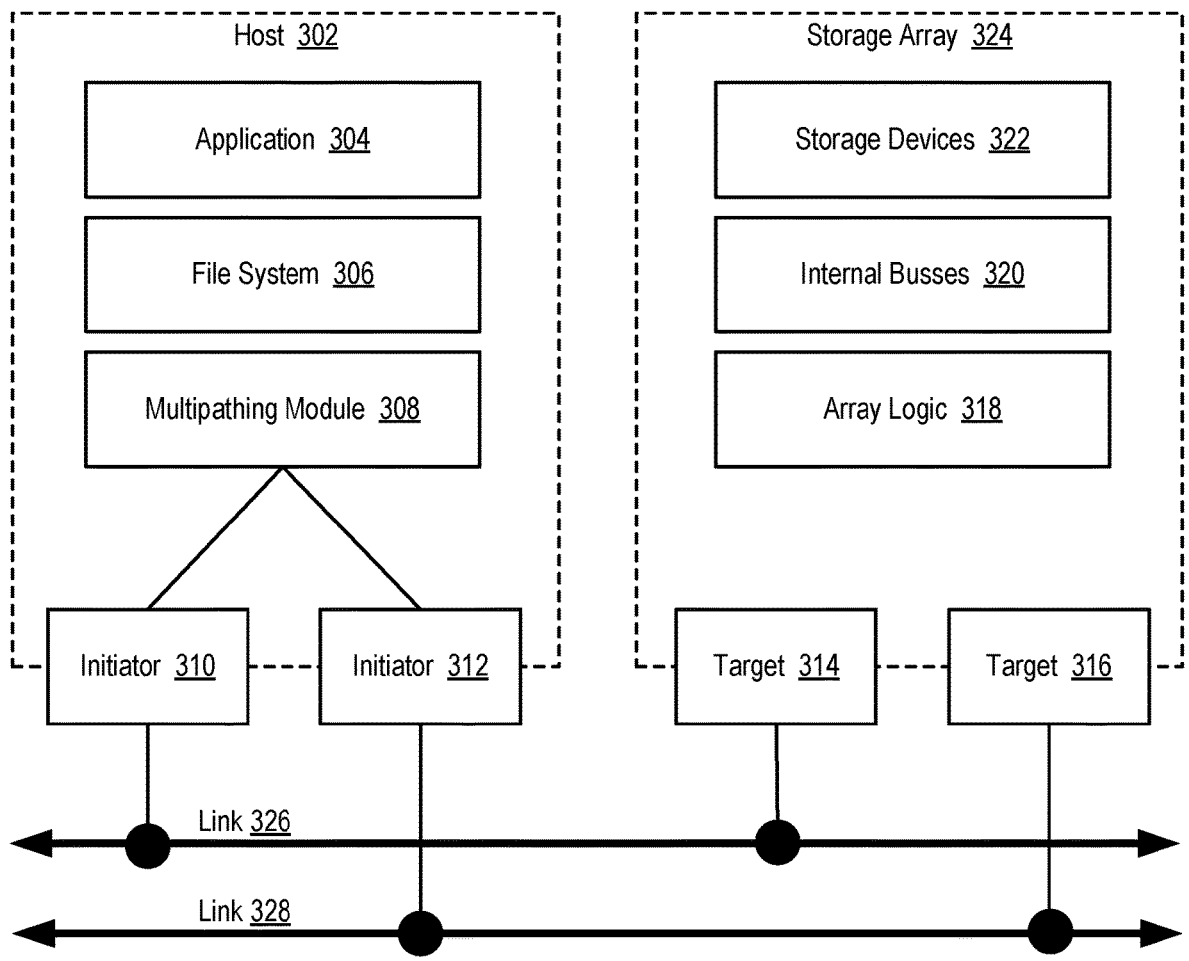
FIG. 3 sets forth a block diagram of a storage system configured for managing I/O queues according to embodiments of the present disclosure.

For further explanation, FIG. 3 a block diagram of a storage system configured for managing I/O queues according to embodiments of the present disclosure. The example storage system includes a host (302) and a storage array (324) that are coupled for data communications by two data communication links (326, 328). The data communication links (326, 328) may be embodied, for example, as SCSI bus or other appropriate data communications bus.

The host (302) depicted in FIG. 3 includes elements of an I/O stack such as an application (304) and a file system (306). The application (304) may be embodied as a software application executing on computer hardware such as a computer processor. The application (304) can sit on top of the file system (306), although such an application could also sit on top of a database or an operating system running on a hypervisor), while the file system (306) may sit on top of local components that facilitate access to the storage array (324) such as multipathing module (308). The multipathing module (308) may be embodied, for example, as an instance of a Linux multipathing device mapper driver.

The host depicted in FIG. 3 also includes two initiators (310, 312). The two initiators (310, 312) depicted in FIG. 3 may be embodied as a data communications hardware utilized to communicate with the storage array (324) and to direct access requests (e.g., read, write, create, delete) to the storage array (324). The two initiators (310, 312) may be embodied, for example, as a SCSI host bus adapter, an iSCSI host bus adapter, a Fibre-Channel host bus adapter, and so on.

The storage array depicted in FIG. 3 also includes two targets (314, 316). The two targets (314, 316) depicted in FIG. 3 may be embodied as a data communications hardware utilized to communicate with the host (302) and to respond to access requests (e.g., read, write, create, delete) received from the host (302). The two targets (314, 316) may be embodied, for example, as a SCSI host bus adapter, an iSCSI host bus adapter, a Fibre-Channel host bus adapter, as a basic Ethernet Network Interface Card with a software implementation of iSCSI or Fibre-Channel over Ethernet, and so on.

The storage array (324) depicted in FIG. 3 includes storage devices (322), internal busses (320), and array logic (318). The storage devices (322) may be embodied, for example, as solid-state drives ('SSDs') that are coupled to the two targets (314, 316) by internal busses (320) and array logic (318) that can direct access requests to the appropriate storage device (322). Readers will appreciate that in the example depicted in FIG. 3, multiple paths may exist between the host (302) and each of the storage devices (322) in the storage array (324). For example, a first path may run through a first initiator (310) and a first target (314) while a second path may run through a second initiator (312) and a second target (316).

Figure 4:
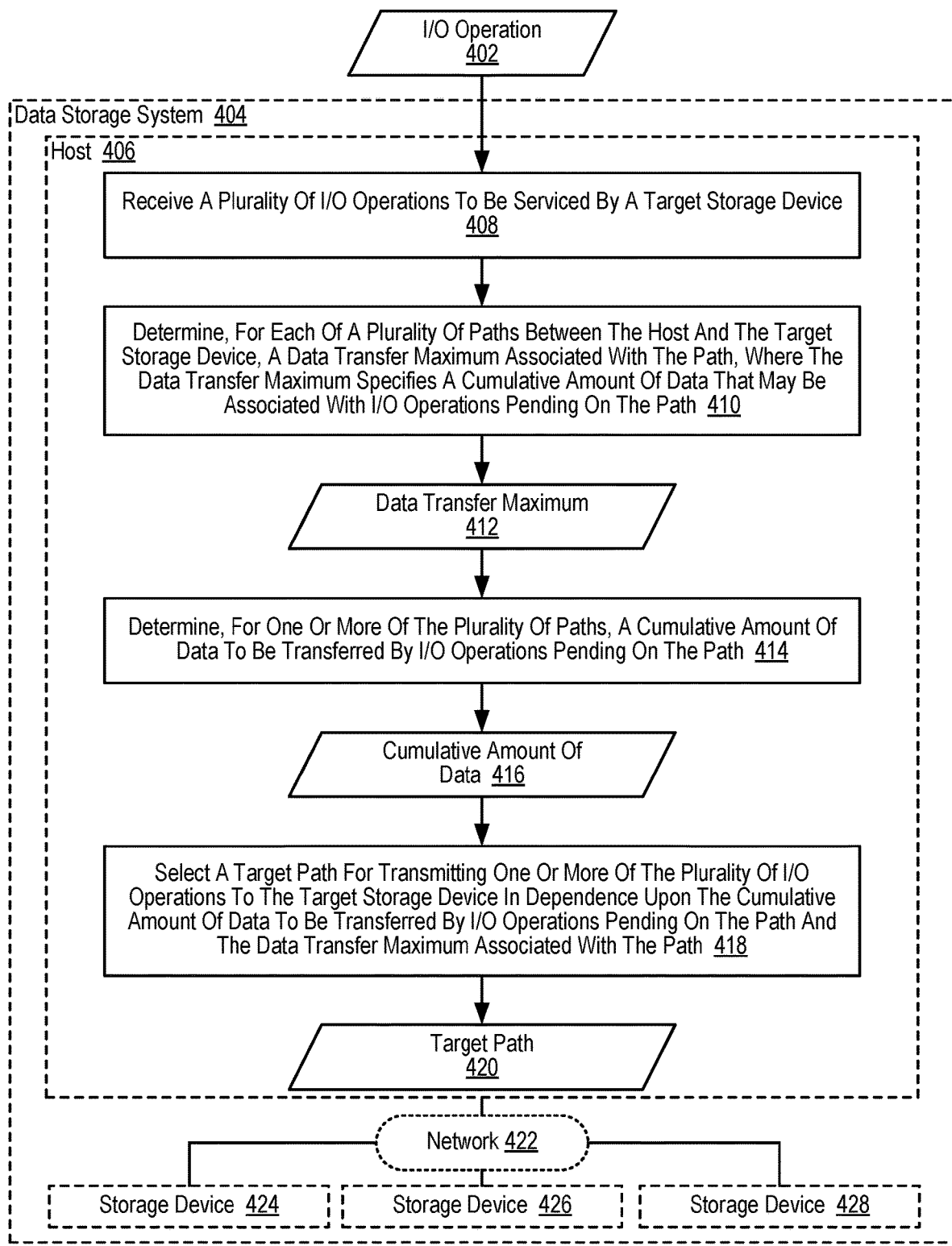
FIG. 4 sets forth a flow chart illustrating an example method for managing I/O queues in a data storage system according to embodiments of the present disclosure.

For further explanation, FIG. 4 sets forth a flow chart illustrating an example method for managing I/O queues in a data storage system (404) according to embodiments of the present disclosure. Although depicted in less detail, the data storage system (404) of FIG. 4 may be similar to the storage arrays described above with reference to FIG. 1, as the data storage system (404) may include multiple storage arrays, multiple storage array controllers in each storage array, and multiple storage devices in each storage array.

The data storage system (404) depicted in FIG. 4 includes a host (406) that is coupled to a plurality of storage devices (424, 426, 428) via a storage network (422). The host (406) in FIG. 4 may be embodied, for example, as a storage array controller that is similar to the storage array controller described above with reference to FIG. 2 and also similar to the host depicted in FIG. 3. The storage network (422) may be embodied, for example, as a group of data communications links and data communications hardware that are used for data communications between the host (406) and the plurality of storage devices (424, 426, 428).

The storage network (422) depicted in FIG. 4 may include multiple paths between each storage device (424, 426, 428) and the host (406). The multiple paths between each storage device (424, 426, 428) and the host (406) may be created, for example, due to the presence of multiple data communications paths through a network, due to the presence of multiple software modules that are involved in the exchange of data between a particular storage device (424, 426, 428) and the host (406), due to the presence of multiple data communications adapters on a particular storage device (424, 426, 428) or the host (406), for other reasons as will occur to those of skill in the art in view of the teachings contained herein, or as the result of any combination of such factors.

Each of the multiple paths between each storage device (424, 426, 428) and the host (406) may include one or more I/O queues. Each I/O queue can be included, for example, as part of a host bus adapter driver that manages a bus that is part of a path between each storage device (424, 426, 428) and the host (406), as part of an operating system SCSI device driver that manages a SCSI device such as the storage device (424, 426, 428), as part of multipathing software that manages the flow of I/O operations between the host (406) and each storage device (424, 426, 428), and so on. When any of these I/O queues get too full, total system performance may lag due to path imbalances resulting in some paths becoming idle while another is still busy processing a large I/O queue.

In the example method depicted in FIG. 4, the I/O operations that are exchanged between the host (406) and each storage device (424, 426, 428) may include I/O operations of different types. Read operations and write operations are one example of I/O operations that are of different types. In the example method depicted in FIG. 4, each distinct path may be utilized to service I/O operations of a particular type between the host (406) and a particular target storage device (424, 426, 428). For example, a first path may be utilized to transmit data read from the first storage device (424) to the host (406) in response to a read operation, a second path may be utilized to transmit data to be written to the first storage device (424) from the host (406) in response to a write operation, a third path may be utilized to transmit data read from a second storage device (426) to the host (406) as part of a read operation, and so on. Readers will appreciate that although example described above relates to embodiments where multiple paths are used to service different types of I/O operations between the host (406) and a particular target storage device (424, 426, 428), in alternative embodiments of the present disclosure, the distinct paths that are used to service I/O operations of a particular type may be distinct directions within a multi-directional path. For example, each path may have both a transmit-from-host-to-storage direction and a transmit-from-storage-to-host direction. Requests and write data move from host to storage. Read data and status/completion responses move from storage to host. These paths may be "full duplex," meaning that the full bandwidth is available in each direction. As a result, the request/response overhead is shared between all I/O types, while write data transfer bandwidth (e.g., the 128 K part of a 128 K write) uses only the host-to-storage bandwidth, and while read data transfer bandwidth (e.g., the 128 K part of a 128 K read) uses only storage-to-host bandwidth.

The example method depicted in FIG. 4 can include receiving (408) an I/O operation (402) to be serviced by a target storage device (424, 426, 428). The I/O operation (402) to be serviced by a target storage device (424, 426, 428) can include, for example, a read operation, a write operation, or other I/O operation. The I/O operation (402) that is to be serviced by a target storage device (424, 426, 428) may be received (408) by the host (406), for example, from a computer that is connected to the host (406) via a storage area network, such as the computers that are connected to the storage array controllers in FIG. 1 via a storage area network.

The example method depicted in FIG. 4 can also include determining (410), for each of a plurality of paths between the host (406) and the target storage device (424, 426, 428), a data transfer maximum (412) associated with the path. The data transfer maximum (412) for each path can specify a cumulative amount of data that is allowed to be associated with I/O operations pending on the path. An I/O operations is said to be 'pending' on a particular path when the I/O operation has been sent from the host (406) to a particular storage device (424, 426, 428) via the path, but the I/O operation has not yet completed as the host (406) has not received an acknowledgement of completion from the storage device (424, 426, 428). Data is associated with an I/O operation that is pending on the path, for example, if the data is to be written to a storage device (424, 426, 428) as the result of executing the I/O operation, if the data is to be read from a storage device (424, 426, 428) as the result of executing the I/O operation, and so on.

In the example method depicted in FIG. 4, determining (410) a data transfer maximum (412) associated with each path may be carried out by the host (406) examining a table, database, or other data store that associates path identifiers with the data transfer maximum (412) for the path that is associated with the path identifier. The values contained in such a table, database, or other data store may be originally configured to preset values during system startup and may be dynamically tuned when the system is operating, as will be described in greater detail below.

The example method depicted in FIG. 4 can also include determining (414), for one or more of the plurality of paths, a cumulative amount of data (416) to be transferred by I/O operations pending on the path. The cumulative amount of data (416) to be transferred by I/O operations pending on the path can be determined (414), for example, by identifying all I/O operations pending on a particular path and summing the amount of data that is associated with each of the I/O operations pending on the particular path. Consider an example in which five I/O operations to write data to a particular storage device (428) are pending on a particular path between the storage device (428) and the host (406): 1) a first I/O operation to write 128 KB of data to the storage device (428), 2) a second I/O operation to write 64 KB of data to the storage device (428), 3) a third I/O operation to write 16 KB of data to the storage device (428), 4) a fourth I/O operation to write 256 KB of data to the storage device (428), and 5) a fifth I/O operation to write 32 KB of data to the storage device (428). In such an example, the cumulative amount of data (416) to be transferred by I/O operations pending on the path would be equal to (128 KB+64 KB+16 KB+256 KB+32 KB) 496 KB.

The example method depicted in FIG. 4 can also include selecting (418) a target path (420) for transmitting the I/O operation (402) to the target storage device in dependence upon the cumulative amount of data (416) to be transferred by I/O operations pending on each path and the data transfer maximum (412) associated with each path. Selecting (418) a target path (420) for transmitting the I/O operation (402) to the target storage device in dependence upon the cumulative amount of data (416) to be transferred by I/O operations pending on each path and the data transfer maximum (412) associated with each path may be carried out, for example, by selecting (418) a target path (420) whose data transfer maximum (412) is greater than the cumulative amount of data (416) to be transferred by I/O operations pending on the path, by selecting (418) a target path (420) whose data transfer maximum (412) is greater than the cumulative amount of data (416) to be transferred by I/O operations pending on the path by a predetermined threshold, by selecting (418) a target path (420) with the largest differential between its data transfer maximum (412) and the cumulative amount of data (416) to be transferred by I/O operations pending on the path, and so on. In some embodiments, the size of data associated with the I/O operation may be taken into account, such that a target path (420) whose data transfer maximum (412) is greater than the sum of the size of data associated with the I/O operation and the cumulative amount of data (416) to be transferred by I/O operations pending on the path is selected (418).

Consider an example in which three candidate target paths are available, where the first path has a data transfer maximum of 512 KB, the second first path has a data transfer maximum of 1024 KB, and the third path has a data transfer maximum of 768 KB. In such an example, assume that the cumulative amount of data to be transferred by I/O operations pending on the first path is 256 KB, the cumulative amount of data to be transferred by I/O operations pending on the second path is 1024 KB, and the cumulative amount of data to be transferred by I/O operations pending on the third path is 640 KB. In such an example, the second path would not be selected (418) as the target path (420) given that the cumulative amount of data to be transferred by I/O operations pending on the second path has already reached the data transfer maximum of the second path. The first path and third path, however, would be available for selection (418) as the target path (420).

Continuing with the example described in the preceding paragraph, in some embodiments of the present invention the first path, the third path, or both paths may also be excluded from being selected (418) as the target path (420). Consider an example in which the I/O operation was an instruction to write 192 KB of data. In such an example, in embodiments where the size of the I/O instruction is also taken into account, the third path would not be selected (418) as the target path (420) given that the cumulative amount of data to be transferred by I/O operations pending on the third path is only 128 KB less than the data transfer maximum of the third path. The first path, however, could be selected (418) as the target path (420) given that the cumulative amount of data to be transferred by I/O operations pending on the first path is 256 KB less than the data transfer maximum of the first path. Readers will appreciate that the path selection described above can be carried out through the use of a calculation that takes into account parameters of the new I/O operation and the potential paths, including at least the size of the new I/O operation and the cumulative I/O transfer sizes pending for the path.

Figure 5:
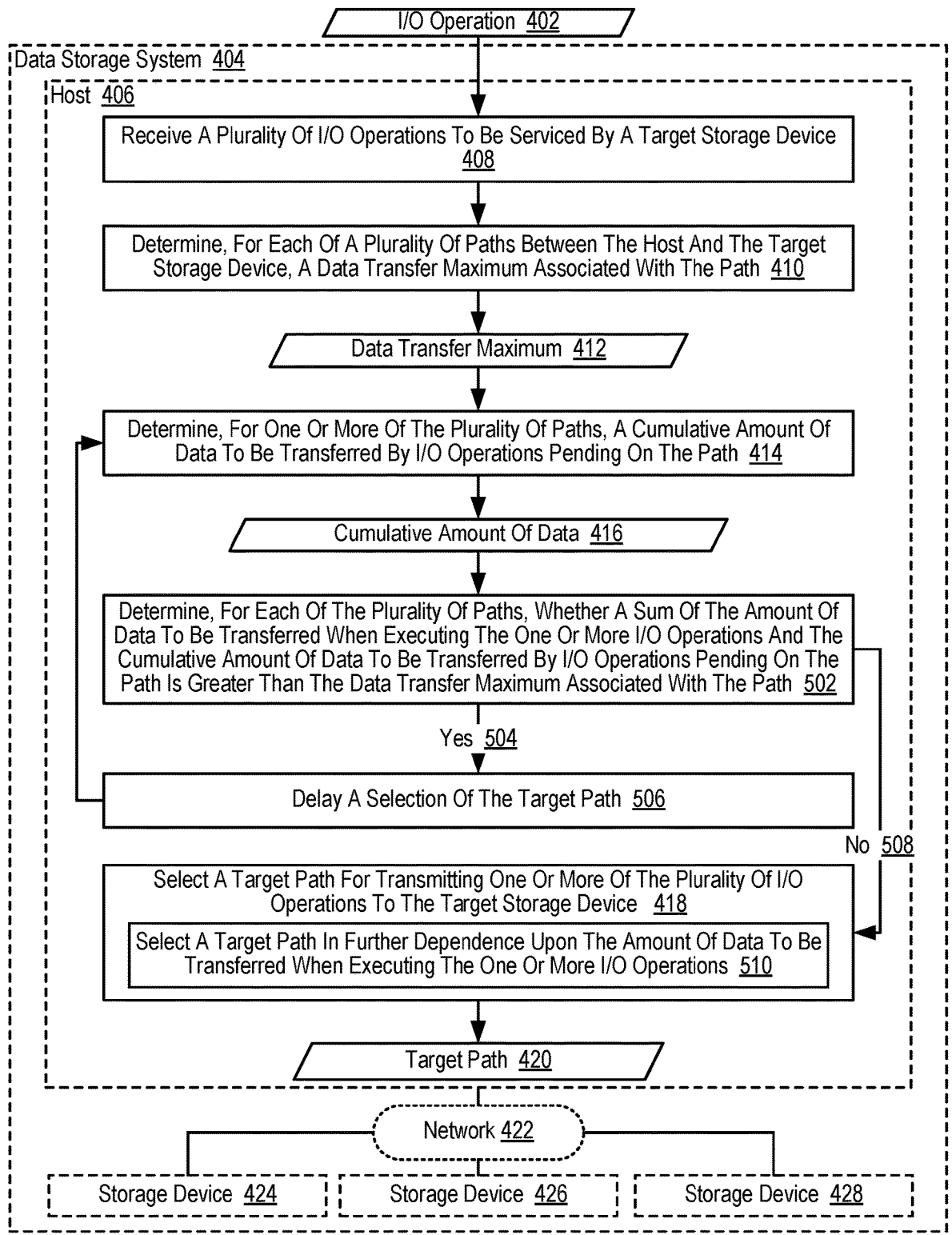
FIG. 5 sets forth a flow chart illustrating an additional example method for managing I/O queues in a data storage system according to embodiments of the present disclosure.

For further explanation, FIG. 5 sets forth a flow chart illustrating an additional example method for managing I/O queues in a data storage system (404) according to embodiments of the present disclosure. The example method depicted in FIG. 5 is similar to the example method depicted in FIG. 4, as the example method depicted in FIG. 5 also includes receiving (408) an I/O operation (402) to be serviced by a target storage device (424, 426, 428), determining (410) a data transfer maximum (412) associated with each of a plurality of paths between the host (406) and the target storage device (424, 426, 428), determining (414) a cumulative amount of data (416) to be transferred by I/O operations pending on one or more of the plurality of paths, and selecting (418) a target path (420) for transmitting the I/O operation (402) to the target storage device in dependence upon the cumulative amount of data (416) to be transferred by I/O operations pending on each path and the data transfer maximum (412) associated with each path.

The example method depicted in FIG. 5 also includes determining (502), for each of the plurality of paths, whether a sum of the amount of data to be transferred when executing the I/O operation (402) and the cumulative amount of data (416) to be transferred by I/O operations pending on the path is greater than the data transfer maximum (412) associated with the path. If the host (406) determines that the sum of the amount of data to be transferred when executing the I/O operation (402) and the cumulative amount of data (416) to be transferred by I/O operations pending on each path is not (508) greater than the data transfer maximum (412) associated with each path, the host may proceed to select (418) a target path (420). If, however, the host (406) affirmatively (504) determines that the sum of the amount of data to be transferred when executing the I/O operation (402) and the cumulative amount of data (416) to be transferred by I/O operations pending on each path is greater than the data transfer maximum (412) associated with each path, the host (406) may not be able to select (418) a target path (420) immediately.

The example method depicted in FIG. 5 also includes delaying (506) a selection of the target path (420). In the example method depicted in FIG. 5, delaying (506) a selection of the target path (420) is carried out in response to affirmatively (504) determining that the sum of the amount of data to be transferred when executing the I/O operation (402) and the cumulative amount of data (416) to be transferred by I/O operations pending on each path is greater than the data transfer maximum (412) associated with each path. Delaying (506) a selection of the target path (420) may be carried out, for example, by the host (406) waiting a predetermined period of time and then determining (414) an updated cumulative amount of data (416) to be transferred by I/O operations pending on one or more of the plurality of paths, by the host (406) waiting until an acknowledgment is received indicating that a predetermined number of pending I/O operations have completed and then determining (414) an updated cumulative amount of data (416) to be transferred by I/O operations pending on one or more of the plurality of paths, and so on. Readers will appreciate that in embodiments of the present disclosure, delaying (506) a selection of the target path (420) may also be carried out through the use of functions that are included within the I/O stack. For example, when an I/O completes, a function within the driver stack is called to note the completion. Such a function can recalculate the new cumulative amount of data (416) to be transferred by I/O operations pending on each path, such that the selection of a target path (420) is not delayed a predetermined period of time but rather delayed until the function naturally detects that a path is available for receiving pending requests.

The preceding paragraph identifies variables (e.g., the predetermined period of time, the predetermined number of pending I/O operations that have completed) that are used to determine how long the selection of the target path (420) is delayed (506). Readers will appreciate that such variables may be managed as boot-time parameters whose values are set during startup of the host (406). Readers will appreciate that such variables may be tuned over time by changing the value of such variables and analyzing whether system performance improved, held steady, or degraded in response to changing the values of such variables. The values of such variables may be tuned in a manner that is similar to the manner in which queue sizes are tuned, as described below with reference to FIG. 7. For example, the host (406) may continue to adjust the value of the variables in the same direction (i.e., increasing or decreasing) as changes that caused system performance to improve, the host (406) may back out changes that caused system performance to degrade or hold steady, and so on.

Readers will further appreciate that although embodiments are described above where delaying (506) a selection of the target path (420) is carried out in response to affirmatively (504) determining that the sum of the amount of data to be transferred when executing the I/O operation (402) and the cumulative amount of data (416) to be transferred by I/O operations pending on each path is greater than the data transfer maximum (412) associated with each path, in alternative embodiments delaying (506) a selection of the target path (420) may only occur once the cumulative amount of data (416) to be transferred by I/O operations pending on each path is greater than the data transfer maximum (412) associated with each path. In such an embodiment, even if placing the I/O operation (402) on a particular path would cause the cumulative amount of data (416) to be transferred by all I/O operations pending on the particular path to exceed the data transfer maximum (412) associated with the particular path, the I/O operation (402) may still be placed on the particular path. In such a way, delaying (506) a selection of the target path (420) may be carried out only when all paths are actually oversubscribed rather than at the point where introducing additional I/O operations to a path would cause all of the I/O paths to become oversubscribed.

In the example method depicted in FIG. 5, selecting (418) the target path (420) can include selecting (510) a target path (420) in further dependence upon the amount of data to be transferred when executing the I/O operation (402). Selecting (510) a target path (420) in further dependence upon the amount of data to be transferred when executing the I/O operation (402) may be carried out, for example, by adding the amount of data to be transferred when executing the I/O operation (402) to the cumulative amount of data (416) to be transferred by I/O operations pending a particular path, to identify the amount of data that would be pending on the path if the path were selected (418) as the target path (420). In such an example, the amount of data that would be pending on the path if the path were selected (418) as the target path (420) may be compared to the data transfer maximum (412) associated with the path to determine whether the path has sufficient bandwidth available to serve as the target path (420).

Consider an example in which three candidate target paths are available, where the first path has a data transfer maximum of 512 KB, the second first path has a data transfer maximum of 1024 KB, and the third path has a data transfer maximum of 768 KB. In such an example, assume that the cumulative amount of data to be transferred by I/O operations pending on the first path is 256 KB, the cumulative amount of data to be transferred by I/O operations pending on the second path is 1024 KB, and the cumulative amount of data to be transferred by I/O operations pending on the third path is 640 KB. Further assume that the I/O operation was an instruction to write 192 KB of data. In such an example, the second path would not be selected (418) as the target path (420) given that the sum of the amount of data to be transferred when executing the I/O operation (402) and the cumulative amount of data (416) to be transferred by I/O operations pending the second path exceeds the data transfer maximum (412) for the second path. The third path would also not be selected (418) as the target path (420) given that the sum of the amount of data to be transferred when executing the I/O operation (402) and the cumulative amount of data (416) to be transferred by I/O operations pending the third path exceeds the data transfer maximum (412) for the third path The first path, however, could be selected (418) as the target path (420) given that the cumulative amount of data to be transferred by I/O operations pending on the first path is 256 KB less than the data transfer maximum of the first path.

Figure 6:
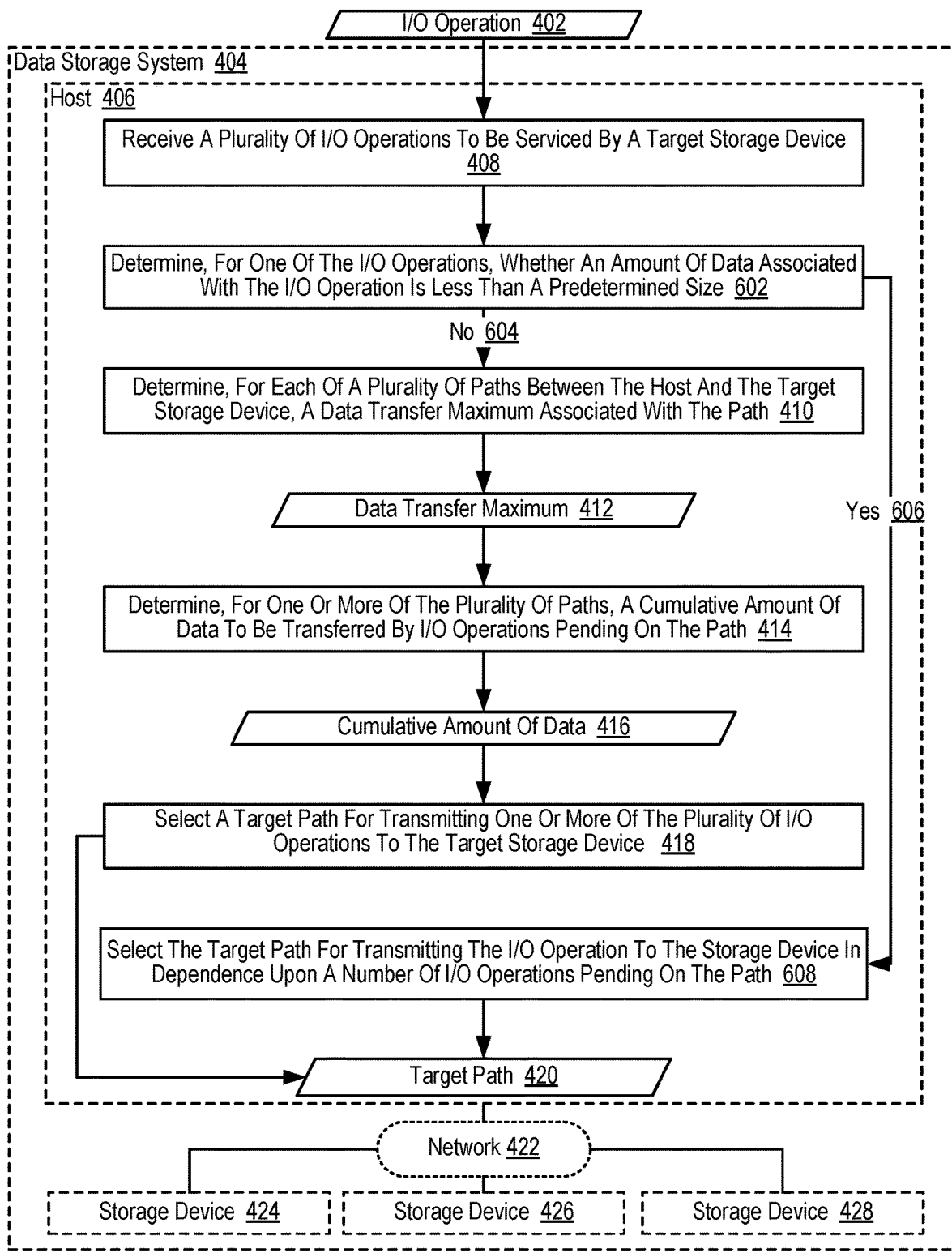
FIG. 6 sets forth a flow chart illustrating an additional example method for managing I/O queues in a data storage system according to embodiments of the present disclosure.

For further explanation, FIG. 6 sets forth a flow chart illustrating an additional example method for managing I/O queues in a data storage system (404) according to embodiments of the present disclosure. The example method depicted in FIG. 6 is similar to the example method depicted in FIG. 4, as the example method depicted in FIG. 6 also includes receiving (408) an I/O operation (402) to be serviced by a target storage device (424, 426, 428), determining (410) a data transfer maximum (412) associated with each of a plurality of paths between the host (406) and the target storage device (424, 426, 428), determining (414) a cumulative amount of data (416) to be transferred by I/O operations pending on one or more of the plurality of paths, and selecting (418) a target path (420) for transmitting the I/O operation (402) to the target storage device in dependence upon the cumulative amount of data (416) to be transferred by I/O operations pending on each path and the data transfer maximum (412) associated with each path.

The example method depicted in FIG. 6 includes determining (602), for the I/O operation (402), whether an amount of data associated with the I/O operation (402) is less than a predetermined size. The predetermined size may represent a threshold that is used to distinguish between large I/O operations and small I/O operations. Distinguish between large I/O operations and small I/O operations may be useful because performing a detailed analysis of which path should be utilized to transfer a particular I/O operation between the host (406) and a storage device (424, 426, 428) requires the utilization of processing resources. As such, the benefit to be gained by strategically selecting a path for a small I/O operation may not be justified by the cost of consuming such processing resources to perform the selection. The benefit to be gained by strategically selecting a path for a large I/O operation, however, may be justified by the cost of consuming such processing resources to perform the selection.

Readers will appreciate that the predetermined size that is utilized as a threshold may be set at a predetermined value when the host (406) is initially booted. The predetermined size, however, need not remain static. In fact, the predetermined size may be dynamically tuned by adjusting the predetermined size and determining whether such an adjustment resulted in improved system performance, degraded system performance, or no change to system performance. Such tuning will be described in greater detail below in the context of tuning the data transfer maximum (412) that is associated with each path, but readers will appreciate that similar principles may be utilized to tune the predetermined size that is utilized as a threshold for distinguishing between large I/O operations and small I/O operations. Readers will further appreciate that the predetermined size that is utilized as a threshold for distinguishing between large I/O operations and small I/O operations may be different for different types of I/O operations.

In the example method depicted in FIG. 6, when the host (406) determines that amount of data associated with the I/O operation (402) is not (604) less than a predetermined size, the host (406) may proceed with determining (410) a data transfer maximum (412) associated with each of a plurality of paths between the host (406) and the target storage device (424, 426, 428), determining (414) a cumulative amount of data (416) to be transferred by I/O operations pending on one or more of the plurality of paths, and selecting (418) a target path (420) for transmitting the I/O operation (402) to the target storage device in dependence upon the cumulative amount of data (416) to be transferred by I/O operations pending on each path and the data transfer maximum (412) associated with each path, as the I/O operation (402) is a large I/O operation. When the host (406) affirmatively (606) determines that amount of data associated with the I/O operation (402) is less than a predetermined size, however, the host (406) may utilize the number of I/O operations that are be pending on each particular path to drive the selection of a path.

The example method depicted in FIG. 6 also includes selecting (608) the target path (420) for transmitting the I/O operation (402) to the storage device (424, 426, 428) in dependence upon a number of I/O operations pending on the path. Selecting (608) the target path (420) for transmitting the I/O operation (402) to the storage device (424, 426, 428) in further dependence upon a number of I/O operations pending on the path may be carried out in response to affirmatively (606) determining that the amount of data associated with the I/O operation is less than the predetermined size. Readers will appreciate that in addition to each path having an associated data transfer maximum (412), each path may also have a maximum number of I/O operations that may be pending on the path. The host (406) may therefore track the number of I/O operations that are pending on each path and may select (608) the target path (420) for transmitting the I/O operation (402) to the storage device (424, 426, 428) in dependence upon a number of I/O operations pending on the path, for example, by selecting the path that has the fewest number of pending I/O operations, by selecting the path that has the lowest percentage of pending I/O operations relative to its capacity, and so on. Readers will appreciate that once the path is selected, however, the size of the small I/O operation may still be included in the cumulative amount of data (416) to be transferred by I/O operations that are pending on the selected path.

Although not depicted in FIG. 6, readers will appreciate that the selection (608) of the target path (420) for transmitting the I/O operation (402) to the storage device (424, 426, 428) in dependence upon a number of I/O operations pending on the path may be carried out in conjunction with selecting (418) a target path (420) for transmitting the I/O operation (402) to the target storage device in dependence upon the cumulative amount of data (416) to be transferred by I/O operations pending on each path and the data transfer maximum (412) associated with each path. For example, the only paths that may be eligible for selection (608) as the target path (420) may be those paths for which the cumulative amount of data (416) to be transferred by I/O operations pending on the path is less than the data transfer maximum (412) associated with each path. Stated differently, any path for which the cumulative amount of data (416) to be transferred by I/O operations pending on the path is not less than the data transfer maximum (412) associated with the path may be ineligible for selection (608) as the target path (420) even if the number of I/O operations pending on the path is well below allowable limits.

Figure 7:
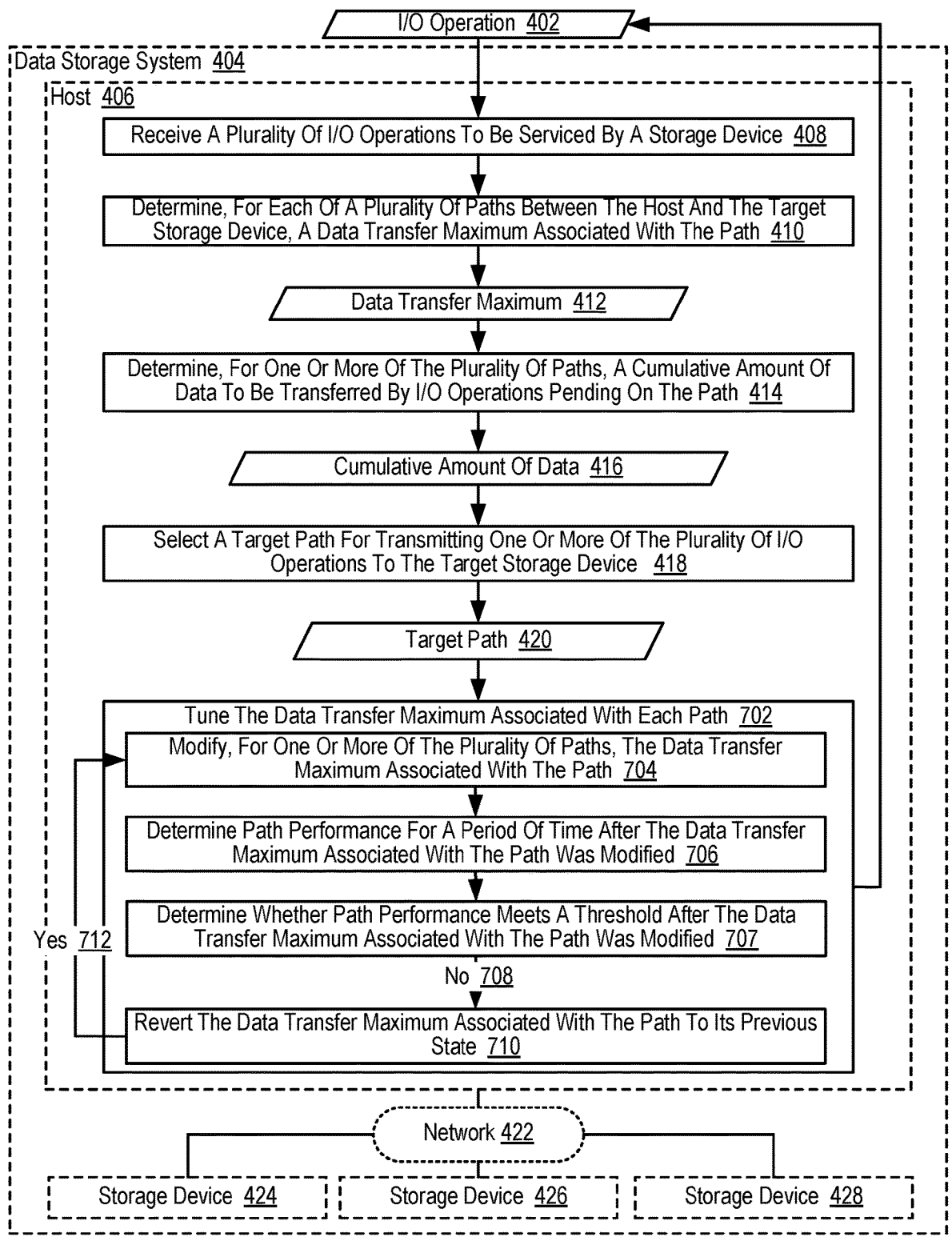
FIG. 7 sets forth a flow chart illustrating an additional example method for managing I/O queues in a data storage system according to embodiments of the present disclosure.

For further explanation, FIG. 7 sets forth a flow chart illustrating an additional example method for managing I/O queues in a data storage system (404) according to embodiments of the present disclosure. The example method depicted in FIG. 7 is similar to the example method depicted in FIG. 4, as the example method depicted in FIG. 7 also includes receiving (408) an I/O operation (402) to be serviced by a target storage device (424, 426, 428), determining (410) a data transfer maximum (412) associated with each of a plurality of paths between the host (406) and the target storage device (424, 426, 428), determining (414) a cumulative amount of data (416) to be transferred by I/O operations pending on one or more of the plurality of paths, and selecting (418) a target path (420) for transmitting the I/O operation (402) to the target storage device in dependence upon the cumulative amount of data (416) to be transferred by I/O operations pending on each path and the data transfer maximum (412) associated with each path.

The example method depicted in FIG. 7 also includes tuning (702) the data transfer maximum (412) associated with one or more paths. Tuning (702) the data transfer maximum (412) associated with one or more paths may be carried out, for example, by adjusting the data transfer maximum (412) for a particular path and determining whether system performance improves, degrades, or is unaffected by the adjusting the data transfer maximum (412). In such an example, the data transfer maximum (412) may continue to be adjusted in the same direction so long as system performance improves.

Consider the example described above in which a particular path had a data transfer maximum (412) of 256 KB. In such an example, tuning (702) the data transfer maximum (412) associated with such a path may be carried out, for example, by increasing the data transfer maximum (412) by 32 KB, such that the new data transfer maximum (412) for the path was 288 KB. If system performance improves, the data transfer maximum (412) may increase another 32 KB, such that the new data transfer maximum (412) for the path is 320 KB. If system performance again improves, the data transfer maximum (412) may increase another 32 KB, such that the new data transfer maximum (412) for the path is 352 KB. This pattern may be continued until, eventually, system performance degrades in response to the increase. In such an example, the data transfer maximum (412) may be rolled back 32 KB to the last value that resulted in improved system performance. In an example, the data transfer maximum (412) may keep increasing and increasing until an optimal point is reached. Readers will appreciate, however, that such tuning (702) may occur many times during the lifetime of the data storage system (404) such that the data transfer maximum (412) for each path is periodically tuned. Readers will further appreciate that such tuning may also be carried out by decreasing the data transfer maximum (412) to determine whether system performance improves in response to a decreased data transfer maximum (412).

In the example method depicted in FIG. 7, tuning (702) the data transfer maximum (412) associated with one or more paths can include modifying (704) the data transfer maximum (412) associated with the path. Modifying (704) the data transfer maximum (412) associated with the path may be carried out, for example, by decreasing the data transfer maximum (412) associated with the path by a predetermined amount, decreasing the data transfer maximum (412) associated with the path by a predetermined percentage, increasing the data transfer maximum (412) associated with the path by a predetermined amount, increasing the data transfer maximum (412) associated with the path by a predetermined percentage, and so on. In such an example, the new data transfer maximum (412) associated with the path may be associated in a table, database, or other data repository that contains the data transfer maximum (412) associated with the path.

In the example method depicted in FIG. 7, tuning (702) the data transfer maximum (412) associated with one or more paths can also include determining (706) path performance for a period of time after the data transfer maximum (412) associated with the path was modified (704). The path performance can be expressed, for example, as the average latency for I/O operations, as the average latency for I/O operations of different types, as the average IOPS performed, as the average IOPS of a particular type that are performed, as the average I/O latency through each path, as the average TOPS performed through each path, and so on. In the example depicted in FIG. 7, the host (406) may maintain or otherwise have access to historical performance metrics for the data storage system (404). The host (406) may therefore retrieve the performance metrics for the data storage system (404) that were generated when the data storage system (404) was utilizing the immediately preceding data transfer maximum (412) associated with the path. The host (406) may subsequently compare the performance metrics for the data storage system (404) that were generated when the data storage system (404) was utilizing the immediately preceding data transfer maximum (412) associated with the path to performance metrics that were generated after the data transfer maximum (412) associated with the path was modified (704).

The example method depicted in FIG. 7 also includes determining (707) whether path performance meets a threshold after the data transfer maximum (412) associated with the path was modified (704). In response to determining that path performance does not (708) meet the threshold after the data transfer maximum (412) associated with the path was modified, the host (406) may be configured to revert (710) the data transfer maximum (412) associated with the path to its previous state. In the example method depicted in FIG. 7, the threshold may be embodied as a dynamic value that may change with each change to the data transfer maximum (412) associated with the path. Consider a first example in which the data transfer maximum (412) associated with the path was modified by increasing the data transfer maximum (412). In such an example, the threshold may be set to a value that is greater than the path performance that was achieved when the data transfer maximum (412) associated with the path was in its previous state. In such a way, the data transfer maximum (412) associated with the path may be reverted (710) to its previous state when increasing the data transfer maximum (412) associated with the path results in path performance degrading or path performance failing to materially change. In a second example in which the data transfer maximum (412) associated with the path was modified by decreasing the data transfer maximum (412), however, the threshold may be set to a value that is equal to the path performance that was achieved when the data transfer maximum (412) associated with the path was in its previous state. In such a way, the data transfer maximum (412) associated with the path may be reverted (710) to its previous state only when decreasing the data transfer maximum (412) associated with the path results in path performance degrading, whereas path performance failing to materially change will not result in the data transfer maximum (412) associated with the path being reverted (710) to its previous state.

In the example method depicted in FIG. 7, tuning (702) the data transfer maximum (412) associated with one or more paths can also include again modifying (704) the data transfer maximum (412) associated with the path. Modifying (704) the data transfer maximum (412) associated with the path may be carried out in response to affirmatively (712) determining that path performance meets the threshold after the data transfer maximum (412) associated with the path was previously modified. In the example method depicted in FIG. 7, again modifying (704) the data transfer maximum (412) associated with the path may be carried out by modifying the data transfer maximum (412) in the same direction that resulted in the threshold being met. For example, an increase to the data transfer maximum (412) that resulted in improved system performance may be followed by additional increases to the data transfer maximum (412), until one of the increases does not result in improved system performance, at which point the increase is reverted. Likewise, a decrease to the data transfer maximum (412) that resulted in improved system performance or no material change to system performance may be followed by additional decreases to the data transfer maximum (412), until one of the decrease results in degraded system performance, at which point the decrease is reverted.

Readers will appreciate that although the embodiments described above relate to embodiments where a single I/O operation (402) is evaluated and ultimately sent to a storage device via a selected path, multiple I/O operations may be pooled and processed in the same way. Furthermore, although embodiments are described above where a target path (420) for transmitting the I/O operation (402) to the target storage device is selected (418) in dependence upon only the cumulative amount of data (416) to be transferred by I/O operations pending on each path and the data transfer maximum (412) associated with each path, readers will appreciate that the usage of the cumulative amount of data (416) to be transferred by I/O operations pending on each path and the data transfer maximum (412) associated with each path may be included in part of a target path (420) selection scheme that takes into account many other parameters such as queue depth or any other parameter.

Example embodiments of the present invention are described largely in the context of a fully functional computer system for managing I/O queues in a data storage system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   determining, for one or more of a plurality of paths between a host and a storage system, a cumulative amount of data to be transferred by I/O operations pending on the path;
   selecting, from the plurality of paths, a target path for transmitting an I/O operation to the storage system based on the cumulative amount of data to be transferred by I/O operations pending on the target path and a data transfer maximum associated with the target path, wherein the data transfer maximum specifies a cumulative amount of data that may be associated with I/O operations pending on the target path;
   modifying the data transfer maximum associated with the target path; and
   responsive to determining that path performance does not meet a threshold during a period of time after the data transfer maximum was modified, reverting the data transfer maximum to its previous state.

2. The method of claim 1 wherein selecting the target path further comprises selecting a target path in further dependence upon an amount of data to be transferred when executing the I/O operation.

3. The method of claim 1 further comprising:
   determining, for each of the plurality of paths, whether a sum of the amount of data to be transferred when executing the I/O operation and the cumulative amount of data to be transferred by I/O operations pending on the path is greater than a data transfer maximum associated with the path; and
   responsive to determining, for each of the plurality of paths, that the sum of the amount of data to be transferred when executing the I/O operation and the cumulative amount of data to be transferred by I/O operations pending on the path is greater than the data transfer maximum associated with the path, delaying a selection of the target path.

4. The method of claim 1 further comprising:
   determining whether an amount of data associated with the I/O operation is less than a predetermined size; and
   responsive to determining that the amount of data associated with the I/O operation is less than the predetermined size, selecting the target path for transmitting the I/O operation to the storage system in dependence upon a number of I/O operations pending on the path.

5. The method of claim 1 further comprising, responsive to determining that path performance does meet the threshold after the data transfer maximum associated with the path was modified, modifying the data transfer maximum associated with the path.

6. The method of claim 1 wherein each path is utilized to service I/O operations of a particular type between the host and the storage system.

7. An apparatus comprising a computer processor, a computer memory operatively coupled to the computer processor, the computer memory having disposed within it computer program instructions that, when executed by the computer processor, cause the apparatus to carry out:
   determining, for one or more of a plurality of paths between a host and a storage system, a cumulative amount of data to be transferred by I/O operations pending on the path;
   selecting, from the plurality of paths, a target path for transmitting an I/O operation to the storage system based on the cumulative amount of data to be transferred by I/O operations pending on the target path and a data transfer maximum associated with the target path, wherein the data transfer maximum specifies a cumulative amount of data that may be associated with I/O operations pending on the target path;
   modifying the data transfer maximum associated with the target path; and
   responsive to determining that path performance does not meet a threshold during a period of time after the data transfer maximum was modified, reverting the data transfer maximum to its previous state.

8. The apparatus of claim 7 wherein selecting the target path further comprises selecting a target path in further dependence upon an amount of data to be transferred when executing the I/O operation.

9. The apparatus of claim 7 further comprising computer program instructions that, when executed by the computer processor, cause the apparatus to carry out:
   determining, for each of the plurality of paths, whether a sum of the amount of data to be transferred when executing the I/O operation and the cumulative amount of data to be transferred by I/O operations pending on the path is greater than a data transfer maximum associated with the path; and
   responsive to determining, for each of the plurality of paths, that the sum of the amount of data to be transferred when executing the I/O operation and the cumulative amount of data to be transferred by I/O operations pending on the path is greater than the data transfer maximum associated with the path, delaying a selection of the target path.

10. The apparatus of claim 7 further comprising computer program instructions that, when executed by the computer processor, cause the apparatus to carry out:
   determining whether an amount of data associated with the I/O operation is less than a predetermined size; and
   responsive to determining that the amount of data associated with the I/O operation is less than the predetermined size, selecting the target path for transmitting the I/O operation to the storage system in dependence upon a number of I/O operations pending on the path.

11. The apparatus of claim 7 further comprising computer program instructions that, when executed by the computer processor, cause the apparatus to carry out, responsive to determining that path performance does not meet the threshold after the data transfer maximum associated with the path was modified, modifying the data transfer maximum associated with the path.

12. The apparatus of claim 7 wherein each path is utilized to service I/O operations of a particular type between the host and the storage system.

13. A computer program product disposed upon a computer readable medium, the computer program product comprising computer program instructions that, when executed, cause a computer to carry out:
   determining, for one or more of a plurality of paths between a host and a storage system, a cumulative amount of data to be transferred by I/O operations pending on the path;
   selecting, from the plurality of paths, a target path for transmitting an I/O operation to the storage system based on the cumulative amount of data to be transferred by I/O operations pending on the target path and a data transfer maximum associated with the target path, wherein the data transfer maximum specifies a cumulative amount of data that may be associated with I/O operations pending on the target path;
   modifying the data transfer maximum associated with the target path; and
   responsive to determining that path performance does not meet a threshold during a period of time after the data transfer maximum was modified, reverting the data transfer maximum to its previous state.

14. The computer program product of claim 13 wherein selecting the target path further comprises selecting a target path in further dependence upon an amount of data to be transferred when executing the I/O operation.

15. The computer program product of claim 13 further comprising computer program instructions that, when executed, cause the computer to carry out:
   determining, for each of the plurality of paths, whether a sum of the amount of data to be transferred when executing the I/O operation and the cumulative amount of data to be transferred by I/O operations pending on the path is greater than a data transfer maximum associated with the path; and
   responsive to determining, for each of the plurality of paths, that the sum of the amount of data to be transferred when executing the I/O operation and the cumulative amount of data to be transferred by I/O operations pending on the path is greater than the data transfer maximum associated with the path, delaying a selection of the target path.

16. The computer program product of claim 13 further comprising computer program instructions that, when executed, cause the computer to carry out:
   determining whether an amount of data associated with the I/O operation is less than a predetermined size; and
   responsive to determining that the amount of data associated with the I/O operation is less than the predetermined size, selecting the target path for transmitting the I/O operation to the storage system in dependence upon a number of I/O operations pending on the path.

17. The computer program product of claim 13 further comprising computer program instructions that, when executed, cause the computer to carry out, responsive to determining that does meet the threshold after the data transfer maximum associated with the path was modified, modifying the data transfer maximum associated with the path.

* * * * *